United States Patent [19]
Hoffmann et al.

[11] Patent Number: 6,134,683
[45] Date of Patent: *Oct. 17, 2000

[54] METHOD FOR MONITORING VIRTUAL CONNECTIONS WITHIN A DIGITAL TELECOMMUNICATION NETWORK USING ERROR RECOGNITION CODE WORDS

[75] Inventors: Robert Hoffmann; Mark Clark, both of Munich, Germany

[73] Assignee: Siemens Aktiengesellschaft, Munich, Germany

[*] Notice: Under 35 U.S.C. 154(b), the term of this patent shall be extended for 1005 days.

[21] Appl. No.: 08/580,790

[22] Filed: Dec. 29, 1995

Related U.S. Application Data

[63] Continuation of application No. 08/035,051, Mar. 22, 1993, abandoned.

[30] Foreign Application Priority Data

Apr. 24, 1992 [DE] Germany ............................. 42 13 628

[51] Int. Cl.$^7$ .................................................. G01R 31/28
[52] U.S. Cl. .................................................. 714/724

[56] References Cited

U.S. PATENT DOCUMENTS

| | | | |
|---|---|---|---|
| 3,732,541 | 5/1973 | Neubauer | 371/69.1 |
| 4,197,523 | 4/1980 | Philip et al. | 371/49.1 |
| 4,821,256 | 4/1989 | Schmidt et al. | 370/13 |
| 5,095,482 | 3/1992 | Grallert | 371/3 |
| 5,121,396 | 6/1992 | Irvin et al. | 371/53 |
| 5,130,977 | 7/1992 | May et al. | 370/60 |
| 5,136,584 | 8/1992 | Hedlund | 370/94.1 |
| 5,138,608 | 8/1992 | Kucera et al. | 370/13 |
| 5,140,583 | 8/1992 | May et al. | 370/60 |
| 5,144,619 | 9/1992 | Munter | 370/60.1 |
| 5,151,902 | 9/1992 | Grallert | 371/5.1 |
| 5,153,578 | 10/1992 | Izawa et al. | 340/825.21 |
| 5,195,093 | 3/1993 | Tarrab et al. | 371/3 |
| 5,251,204 | 10/1993 | Izawa et al. | 370/15 |
| 5,268,909 | 12/1993 | Loebig | 371/49.1 |
| 5,309,438 | 5/1994 | Nakajima | 370/94.1 |
| 5,313,453 | 5/1994 | Uchida et al. | 370/13 |

Primary Examiner—Robert W. Beausoliel, Jr.
Assistant Examiner—Pierre Eddy Elisca
Attorney, Agent, or Firm—Hill & Simpson

[57] ABSTRACT

In a telecommunication network of ATM exchanges (V1, Vn) via which information transmitted in the STM mode can also be switched, error-detecting code words (EDCE) are respectively derived at an exchange input (EVi) from the content of information parts (PL) of a defined plurality of ATM cells in order to monitor the through-connections through an exchange. These error-detecting code words (EDCE) are transmitted to an exchange output in transition monitoring cells (DUZ) together with the plurality of information parts (PL) and are compared thereat to a newly formed error-detecting code word.

8 Claims, 2 Drawing Sheets

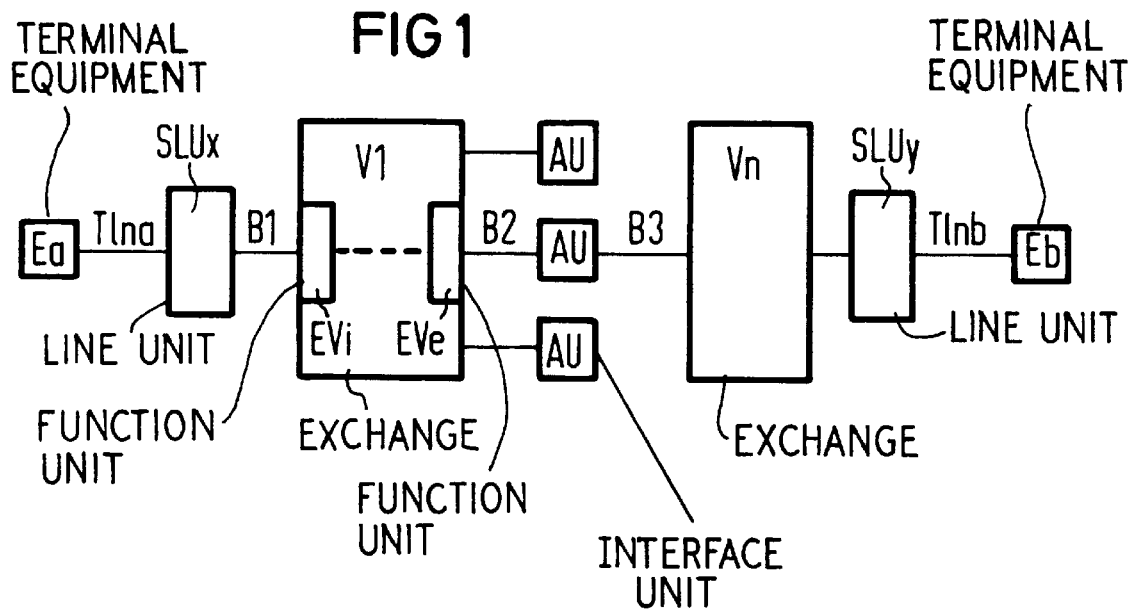
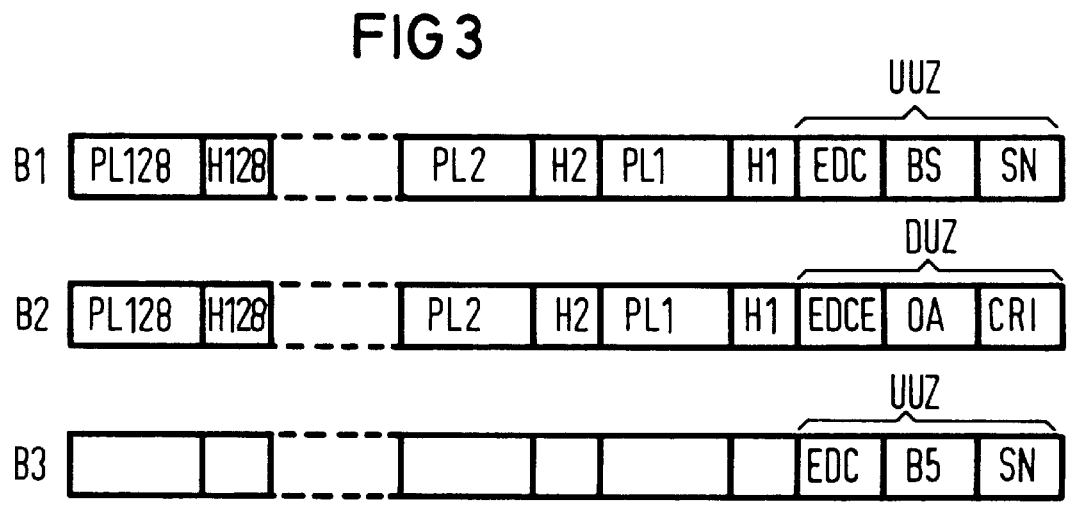

METHOD FOR MONITORING VIRTUAL CONNECTIONS WITHIN A DIGITAL TELECOMMUNICATION NETWORK USING ERROR RECOGNITION CODE WORDS

This is a continuation of application Ser. No. 08/035,051, filed Mar. 22, 1993, now abandoned.

BACKGROUND OF THE INVENTION

The present invention is directed to a method for monitoring virtual connections within a digital telecommunication network that is formed of switching centers operating in asynchronous transfer mode (ATM) Via which information transmitted in synchronous transfer mode (STM) can also be switched.

In such a method, a monitoring cell which may potentially contain a sequence identifier, a particular about the length of an information cell block, but is sure to contain an error-detecting code word, is respectively allocated to the information cell blocks (having a cell header and an information part) to be transmitted, being allocated thereto at the point of origin of the transmission link carrying the virtual connection. An information falsification is then respectively recognized at the end point of the appertaining transmission link by renewed formation of an error-detecting code word and by comparison thereof to the error-detecting code word transmitted from the point of origin, whereby at least an alarm occurs at the point of origin of the appertaining transmission link in case of error.

The faulty insertion of information cells into the information stream, the loss of such information cells as well as the falsification of information cell blocks during the course of transmission on the transmission links can be recognized in this way.

SUMMARY OF THE INVENTION

It is an object of the present invention to provide a method wherein the setup and the correct handling of the call through-connection can also be monitored within exchanges operating on the ATM basis that form the initially cited network.

This object is achieved by a method of the present invention for monitoring virtual connections within a digital telecommunication network that is formed of exchanges operating in asynchronous transfer mode via which information transmitted in synchronous transfer mode can also be switched. Transmission monitoring cells that contain a regular error-detecting code word and that may contain a sequence identifier as well as a particular about the length of the information cell block are respectively allocated to the information cell blocks to be transmitted and respectively have a header part and an information part, being allocated thereto at the originating location of transmission links carrying the virtual connections. An evaluation, on the basis whereof an information falsification can be recognized, respectively occurs at an end point of the appertaining transmission link by renewed formation of an error-detecting code word and by comparison thereof to the error-detecting code word transmitted from the originating location. A message at least to the originating location of the appertaining transmission link is undertaken in case of an error. New error-detecting code words are respectively formed at the access boundary of an exchange upon exclusive acquisition of the information parts of the information cells of the information cell blocks. The new error-detecting code words are transmitted through the exchange as a component part of transition monitoring cells and are evaluated at the exit boundary of the exchange. An appertaining error message to the maintenance position responsible therefor is output given an error that is thereby identified. Before the information cell blocks pass the exit boundary, the transition monitoring cells are again replaced by transmission monitoring cells whose regular error-detecting code word respectively covers the entire, appertaining information cell block.

In an advantageous development of the present invention an originating address referred to the exchange access is also inserted into the transition monitoring cells at the respective access boundary of an exchange. A monitoring for the respective appearance of the appertaining, anticipated originating address occurs at the exchange outputs. A check identifier is additionally inserted into the transition monitoring cells at the access boundary. The check identifier identifies the information cells of the appertaining information cell block as dummy cells in the call setup condition and prevents evaluation or new formation of an error-detecting code word.

In a further development of the present invention an error message due to the non-coincidence of compared error-detecting code words of transition monitoring cells is only output after a repeated repetition of a non-coincidence. However, an error message due to the failure of an originating address to arrive or due to the reception of an originating address other than the anticipated originating address is immediately output.

The monitoring of virtual connections on the transmission links from and to as well as between the exchanges is thus supplemented by the present invention with a call monitoring within the exchange upon utilization of the instruments created for this purpose. This is particularly possible in that the cell header content of the information cells that can change when passing through the switching network of the exchange remains out of consideration in the formation of the error-detecting code word.

According to a further development of the present invention, an origin address referred to the exchange access is respectively inserted into the transition monitoring cells at the respective access boundary to an exchange. A monitoring for the respective appearance of the appertaining, anticipated origin address is then undertaken at the exchange outputs. Further, a check identifier is inserted into the transition monitoring cells at the access boundary, this check identifier identifying information cells of the appertaining information cell block as dummy cells in the call setup status and preventing the evaluation or new formation of an error-detecting code word.

On the basis of this development of the present invention, the proper creation of the connections as well as the faulty creation of double connections can be recognized in the call setup status. Also, lost calls and through-connection errors can be identified in the status of setup calls.

According to another development of the present invention, an error message on the basis of non-coincidence of compared error-detecting code words only leads to an error message after a repeated repetition of a non-coincidence. However, an error message on the basis of the failure of an originating address to arrive or due to the reception of an originating address other than the anticipated originating address immediately leads to an error message.

The different extent of the effects of various types of errors is taken into consideration in this way.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 is a portion of a block circuit diagram of a digital telecommunication network;

FIG. 3 shows information cell blocks formed of the FIG. 2 information cells with allocated monitoring cell, as they appear in sub-regions of this telecommunication network.

DESCRIPTION OF THE PREFERRED EMBODIMENT

Figure 2:
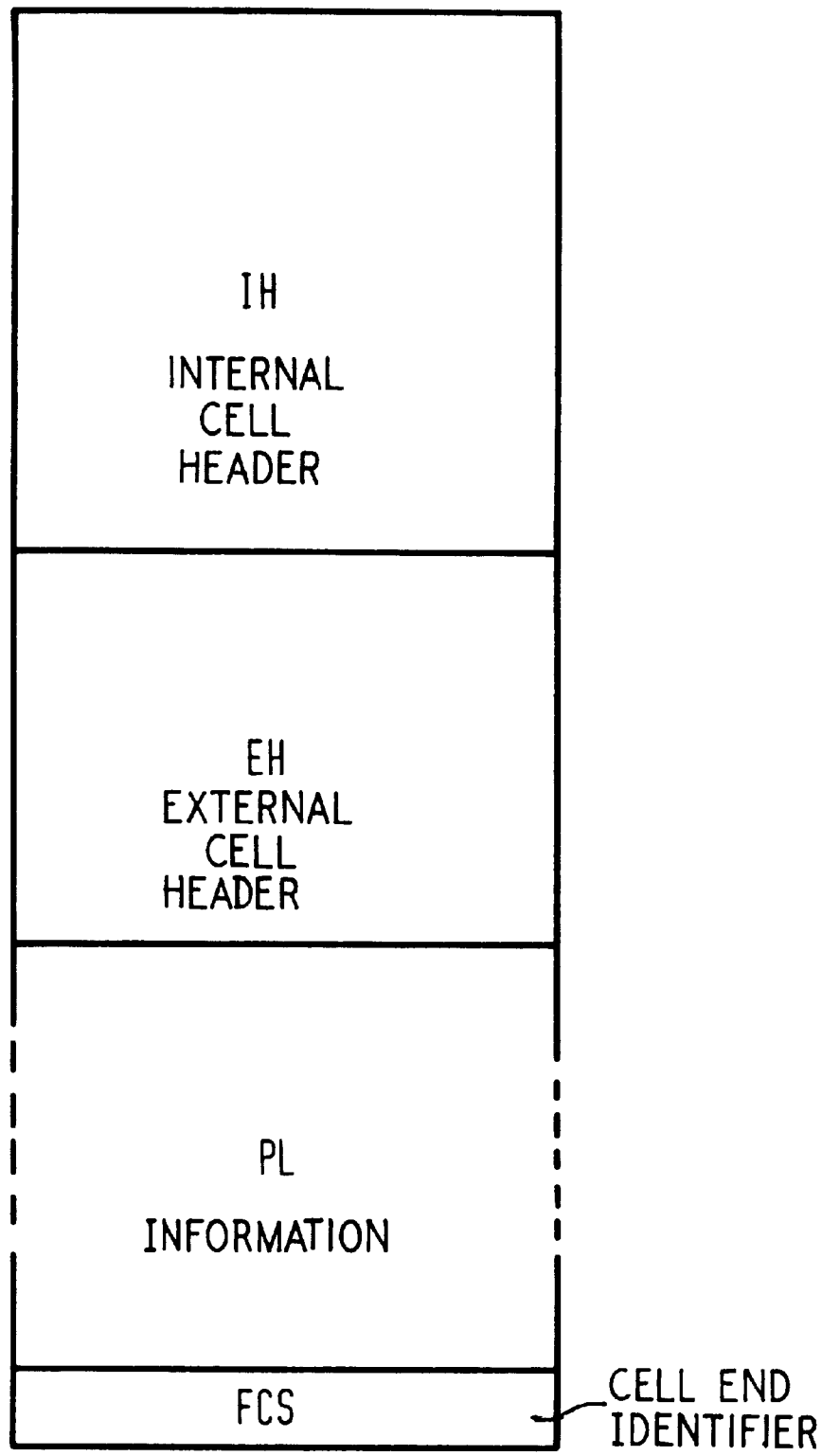
FIG. 2 depicts the structure of an individual information cell.

FIG. 1 shows two exchanges V1 and Vn of a digital telecommunication network. These exchanges V1 and Vn represent exchanges operating in the asynchronous transfer mode, i.e. ATM exchanges.

The connection of a subscriber line T1n connecting terminal equipment Ea via a line unit SLUx is shown at the exchange V1. Connections of this exchange to other exchanges via interface units AU, particularly the connection to the exchange Vn, are also shown. The connection of a subscriber line T1nb connecting a terminal equipment Eb is shown at the exchange Vn via a line unit SLUy.

During the course of a connection of the terminal equipment Ea to the terminal equipment Eb, the information from the terminal equipment Ea (which can be assumed to be voice information) is supplied to a packeting/depacketing means within the line unit SLUx that orders this information in information cells whose structure shall be set forth below with reference to FIG. 2.

A standard information cell as shown in FIG. 2 has a total of 62 octets, i.e. time slots of eight bits each. The standard information cell has an external cell header EH, an information part PL and a monitoring cell UUZ. Eight such octets are occupied for an internal cell header IH that essentially contains a synchronization octet, octets containing routing information for the route through the switching network, and an octet for a cell number for determining the cell sequence. A further cell header (the external cell header EH) has five octets and contains particulars about a virtual channel and a virtual connecting path to which the appertaining message cell is allocated. This is followed by an information part PL having forth eight octets in which the actual telecommunication information is transmitted. Finally, a further octet FCS that identifies the cell end follows.

After passing through an exchange, the aforementioned, internal cell header IH is removed from the information cell before further transmission, so that cells appearing externally are only composed of the external cell header EH and the information part PL.

As B1 in FIG. 3 shows, a monitoring cell UUZ is respectively allocated to blocks of 128 external information cells in this case, i.e. information cells composed of external cell header EH and information part PL. This monitoring cell UUZ contains a particular SN for identifying the sequence of the monitoring cell, a particular BS regarding the length of the allocated information cell block and an error-detecting code word EDC. The error-detecting code word is formed over the totality of octets of the 128 external information cells. Due to the monitoring cell UUZ, the proper transmission of such message blocks can be monitored between line units, such as the line units SLUx and SLUy, and the appertaining exchanges as well as between these exchanges. According to a CCITT proposal, an error-detecting code word is respectively formed for this purpose at the end point of a transmission link, i.e., for example, at the input boundary of the exchange V1. It is formed on the basis of the content of the information cells of the information cell block received thereat and is compared to the co-transmitted error-detecting code word EDC of the monitoring cell UUZ of the cell block. In case of a non-coincidence, an error message in a return direction occurs at least to the originating location of the appertaining transmission link, i.e. to the line unit SLUx in FIG. 1 that belongs to the area of the exchange V1.

The transmission monitoring cell UUZ is removed before passing through the exchange, since the error-detecting code word no longer has any validity after passing through the exchange due to modification of the particulars about the virtual channel and the virtual connecting path. The transmission monitoring cell UUZ and, in particular, the error-detecting code word thereof is formed anew at the output boundary of the exchange, i.e. at the originating location of a further transmission link, and is forwarded together with the appertaining information block.

In order to be able to check the quality of the connections within the exchanges, a monitoring cell DUZ is inventively formed by an input-side function unit EVi at the access boundary of such an exchange, at the exchange V1, for example, in the case illustrated in FIG. 1. The monitoring cell B2, shown in FIG. 3, depicts the an error-detecting code word EDCE with an information cell block like that in line B1 of FIG. 3. The monitoring cell DUZ contains an error-detecting code word EDCE in whose formation, however, only taken into consideration are the information cells PL of the allocated information cell block that also has 128 information cells. After the information cell block has passed through the exchange, a function unit EVe again forms such an error-detecting code word and compares it to the co-transmitted information word EDCE. An error message to the maintenance position responsible for the appertaining exchange occurs in the case of a non-coincidence.

Before the information cell block is forwarded, the transition monitoring cell DUZ is replaced by the newly formed, aforementioned transmission monitoring cell UUZ. Line B3 in FIG. 3 shows the newly formed transmission monitoring cell UUZ together with an information cell block (not referenced in detail) that is like the information cell blocks in lines B1 and B2 of FIG. 3.

According to a further development of the present invention, an originating address referring to the exchange access is also respectively inserted into the transition monitoring cell DUZ at the access boundary to an exchange, i.e. by the function unit EVi in the case of the exchange V1. A monitoring for the appearance of the appertaining, anticipated originating address is then undertaken at the exchange output, i.e. by the function unit EVe. Double connections that have erroneously arisen and line interruptions can be recognized in this way.

In order to also be able to already undertake such a test (connecting path/through-connection test) during the call setup, a check identifier is also inserted into the transition monitoring cells DUZ. This check identifier CRI identifies the information cells of the appertaining information cell block as dummy cells in the call setup status and thus preventing evaluation or new formation of an error-detecting code word EDCE.

These parts of the transition monitoring cell DUZ are also removed at the exit boundary of the exchange.

Insofar as they relate to an information falsification that becomes apparent by comparing an originally formed and a newly formed error-detecting code word, the aforementioned error messages are output from the end point of the virtual connection back to the starting point thereof or from the exit boundary of an exchange to a maintenance location responsible for this exchange only when such an error has multiply appeared a prescribed number of times within a defined time span. By contrast, errors that relate to double connections and the like and that are recognized using the originating address immediately lead to such an error message.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for monitoring virtual connections within a digital telecommunication network that is formed of exchanges, connected by transmission lines, operating in asynchronous transfer mode via which information transmitted in synchronous transfer mode is also switchable, wherein transmission monitoring cells, that contain a regular error-detecting code word and that may contain a sequence identifier as well as a particular about a length of an information cell block, are respectively allocated to information cell blocks to be transmitted, each of the monitoring cells having a header part and an information part and being allocated to a respective information cell block at an originating location of transmission links carrying the virtual connections, the error-detecting code word being formed using a totality of the information cell blocks, wherein an evaluation, on the basis whereof an information falsification is recognizable, respectively occurs at an end point of an appertaining transmission link by renewed formation of a further error-detecting code word and by comparison thereof to the regular error-detecting code word transmitted from the originating location, and wherein a message at least to the originating location of the appertaining transmission link is undertaken in case of a recognized information falsification, comprising the steps of:

forming error-detecting code words at an access boundary of a respective exchange upon exclusive acquisition of information parts of information cells of information cell blocks;

forming transition monitoring cells from said error-detecting code words and said information cells;

transmitting said error-detecting code words through the respective exchange as a component part of said transition monitoring cells;

evaluating said error-detecting code words at an exit boundary of the respective exchange and outputting an appertaining error message to a maintenance position responsible therefor given an information falsification that is thereby identified;

before the information cell blocks pass the exit boundary, replacing the transition monitoring cells by newly formed transmission monitoring cells whose regular error-detecting code word respectively covers the entire, appertaining information cell block; and wherein the information cell block is thereby faultlessly transmitted over the respective virtual connection.

2. The method according to claim 1, wherein an originating address referred to the access boundary of the exchange is also inserted into the transition monitoring cells at the respective access boundary of the respective exchange; wherein a monitoring for a respective appearance of an appertaining, anticipated originating address occurs at the exit boundary of the exchange; and wherein a check identifier is also inserted into the transition monitoring cells at the access boundary, said check identifier identifying the information cells of the appertaining information cell block as dummy cells in a call setup condition and preventing evaluation or new formation of an error-detecting code word.

3. The method according to claim 1, wherein an error message due to a non-coincidence of compared error-detecting code words of transition monitoring cells is only output after a repeated repetition of a non-coincidence, and wherein an error message due to a failure of an originating address to arrive or due to a reception of an originating address other than an anticipated originating address is immediately output.

4. A method for monitoring virtual connections within a digital telecommunication network that is formed of exchanges, connected by transmission lines, operating in asynchronous transfer mode via which information transmitted in synchronous transfer mode is also switchable, comprising:

allocating transmission monitoring cells, that contain a regular error-detecting code word and that may contain a sequence identifier as well as a particular about a length of an information cell block, to information cell blocks to be transmitted, each of the monitoring cells having a header part and an information part, the error-detecting code word being formed using a totality of the information cell blocks, and being allocated to a respective information cell block at an originating location of transmission links carrying the virtual connections;

evaluating at an end point of an appertaining transmission link by renewed formation of a further error-detecting code word and by comparison thereof to the regular error-detecting code word transmitted from the originating location, on the basis whereof an information falsification is recognizable;

providing a message at least to the originating location of the appertaining transmission link in case of a recognized information falsification;

forming error-detecting code words at an access boundary of a respective exchange upon exclusive acquisition of information parts of information cells of information cell blocks;

forming transition monitoring cells from said error-detecting code words and said information cells;

transmitting said transition monitoring cells with said error-detecting code words through the respective exchange;

evaluating said error-detecting code words at an exit boundary of the respective exchange and outputting an appertaining error message given an information falsification that is thereby identified;

before the information cell blocks pass the exit boundary, replacing the transition monitoring cells by newly formed transmission monitoring cells each having a regular error-detecting code word that respectively covers the entire, appertaining information cell block; and wherein the information cell block is thereby faultlessly transmitted over the respective virtual connection.

5. The method according to claim 4, wherein an originating address referred to the access boundary of the exchange is also inserted into the transition monitoring cells at the respective access boundary of the respective exchange; wherein a monitoring for a respective appearance of an appertaining, anticipated originating address occurs at the exit boundary of the exchange; and wherein a check identifier is also inserted into the transition monitoring cells at the access boundary, said check identifier identifying the information cells of the appertaining information cell block as dummy cells in a call setup condition and preventing evaluation or new formation of an error-detecting code word.

6. The method according to claim 4, wherein an error message due to a non-coincidence of compared error-detecting code words of transition monitoring cells is only output after a repeated repetition of a non-coincidence, and wherein an error message due to a failure of an originating address to arrive or due to a reception of an originating address other than an anticipated originating address is immediately output.

7. A method for monitoring virtual connections within a digital telecommunication network that is formed of exchanges, connected by transmission lines, operating in asynchronous transfer mode via which information transmitted in synchronous transfer mode is also switchable, wherein transmission monitoring cells, that contain a regular error-detecting code word and that may contain a sequence identifier as well as a particular about a length of an information cell block, are respectively allocated to information cell blocks to be transmitted, each of the monitoring cells having a header part and an information part, the error-detecting code word being formed using a totality of the information cell blocks, and being allocated to a respective information cell block at an originating location of transmission links carrying the virtual connections, wherein an evaluation, on the basis whereof an information falsification is recognizable, respectively occurs at an end point of an appertaining transmission link by renewed formation of a further error-detecting code word and by comparison thereof to the regular error-detecting code word transmitted from the originating location, and wherein a message at least to the originating location of the appertaining transmission link is undertaken in case of a recognized information falsification, comprising the steps of:

forming error-detecting code words at an access boundary of a respective exchange upon exclusive acquisition of information parts of information cells of information cell blocks;

forming transition monitoring cells from said error-detecting code words and said information cells;

transmitting said error-detecting code words through the respective exchange as a component part of said transition monitoring cells;

evaluating said error-detecting code words at the exit boundary of the respective exchange and outputting an error message due to a non-coincidence of compared error-detecting code words of transition monitoring cells only after a repeated repetition of a non-coincidence, and immediately outputting an error message due to a failure of an originating address to arrive or due to a reception of an originating address other than an anticipated originating address;

before the information cell blocks pass the exit boundary, replacing the transition monitoring cells by newly formed transmission monitoring cells whose regular error-detecting code word respectively covers the entire, appertaining information cell block; and wherein the information cell block is thereby faultlessly transmitted over the respective virtual connection.

8. The method according to claim 7, wherein an originating address referred to the access boundary of the exchange is also inserted into the transition monitoring cells at the respective access boundary of the respective exchange; wherein a monitoring for a respective appearance of an appertaining, anticipated originating address occurs at the exit boundary of the exchange; and wherein a check identifier is also inserted into the transition monitoring cells at the access boundary, said check identifier identifying the information cells of the appertaining information cell block as dummy cells in a call setup condition and preventing evaluation or new formation of an error-detecting code word.

\* \* \* \* \*